US006705079B1

(12) United States Patent
Tabor et al.

(10) Patent No.: US 6,705,079 B1
(45) Date of Patent: Mar. 16, 2004

(54) APPARATUS FOR CONTROLLING BOUNCE OF HYDRAULICALLY POWERED EQUIPMENT

(75) Inventors: Keith A. Tabor, Richfield, WI (US); Joseph L. Pfaff, Wauwatosa, WI (US); Dwight B. Stephenson, Delafield, WI (US)

(73) Assignee: Husco International, Inc., Waukesha, WI (US)

( * ) Notice: Subject to any disclaimer, the term of this patent is extended or adjusted under 35 U.S.C. 154(b) by 20 days.

(21) Appl. No.: 10/255,033

(22) Filed: Sep. 25, 2002

(51) Int. Cl.[7] .................................... F16D 31/02
(52) U.S. Cl. .................................... 60/469; 91/433
(58) Field of Search ........................... 60/469; 91/433

(56) References Cited

U.S. PATENT DOCUMENTS

| | | | | | |
|---|---|---|---|---|---|
| 4,194,365 | A | | 3/1980 | Stoufflet et al. | |
| 4,520,625 | A | | 6/1985 | Sato et al. | |
| 4,586,332 | A | | 5/1986 | Schexnayder et al. | |
| 4,628,690 | A | | 12/1986 | Arai et al. | |
| 4,757,685 | A | | 7/1988 | Burckhartzmeyer | |
| 5,025,626 | A | | 6/1991 | Crosser et al. | |
| 5,622,226 | A | * | 4/1997 | Hausman et al. | 172/4.5 |
| 5,832,730 | A | * | 11/1998 | Mizui | 60/469 |
| 5,857,333 | A | * | 1/1999 | Schmidt et al. | 60/469 |
| 5,897,287 | A | * | 4/1999 | Berger et al. | 91/433 |
| 6,328,173 | B1 | * | 12/2001 | Wimmer | 212/278 |
| 6,328,275 | B1 | | 12/2001 | Yang et al. | |
| 6,532,738 | B2 | | 3/2003 | Sharkness et al. | |
| 6,634,172 | B2 | * | 10/2003 | Schoonmaker et al. | 60/329 |

* cited by examiner

*Primary Examiner*—Edward K. Look
*Assistant Examiner*—Michael Leslie
(74) *Attorney, Agent, or Firm*—George E. Haas; Quarles & Brady LLP

(57) ABSTRACT

When a swinging boom driven by a hydraulic cylinder stops, inertia causes continued motion of the boom which increases pressure in a chamber of the hydraulic cylinder. Eventually that pressure reaches a level which causes the boom to reverse direction. Then pressure in an opposite cylinder chamber increases until reaching a level that causes the boom movement to reverse again. This oscillation continues until the motion is dampened by other forces acting on the boom. As a result, an operator has difficulty in properly positioning the boom. To reduce this oscillating effect, a sensor detects when the cylinder chamber pressure increases above a given magnitude and then a determination is made when the rate of change of that pressure is less than a defined threshold. Upon that occurrence, a control value is opened to relieve the pressure in that cylinder chamber.

21 Claims, 2 Drawing Sheets

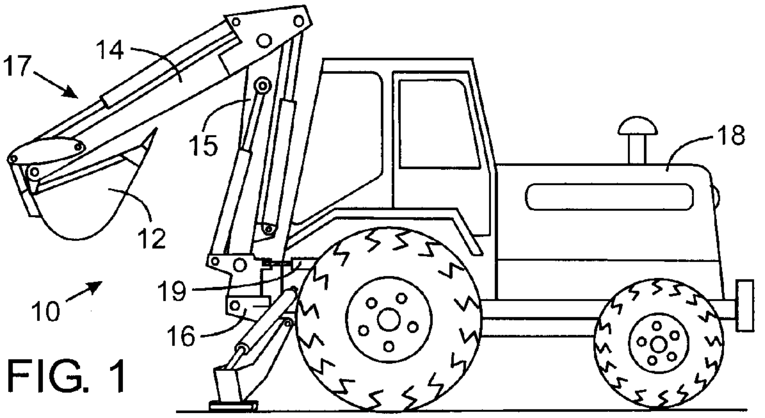
FIG. 1
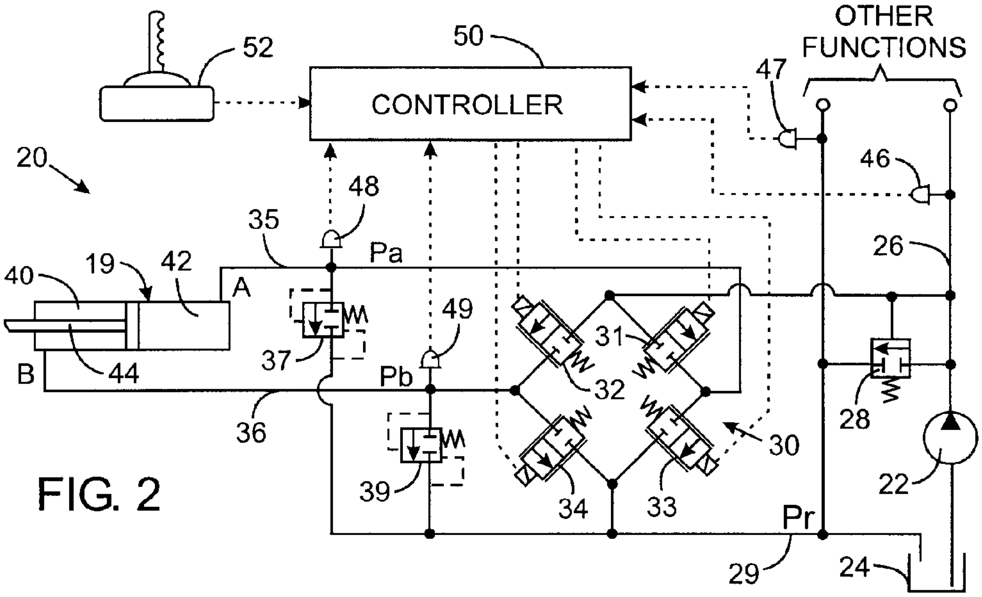
FIG. 2
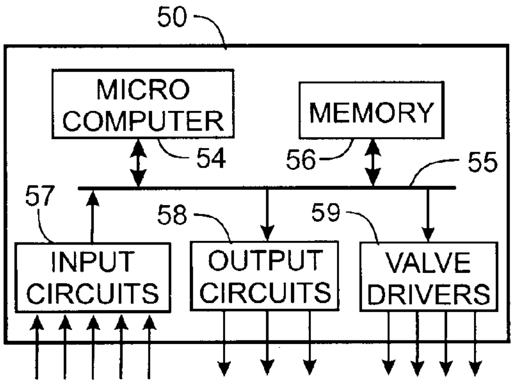
FIG. 3
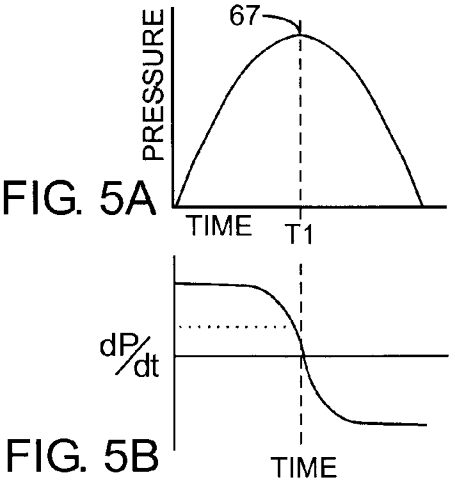
FIG. 5A
FIG. 5B

APPARATUS FOR CONTROLLING BOUNCE OF HYDRAULICALLY POWERED EQUIPMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulically powered equipment, such as off-road construction and agricultural vehicles, and more particularly to apparatus for reducing bounce when a hydraulically driven member on the equipment is stopped suddenly.

2. Description of the Related Art

With reference to FIG. 1, a backhoe 10 is a common type of earth moving equipment that has a bucket 12 attached to the end of an arm 14 which in turn is coupled by a boom 15 to the frame of a tractor 18. A joint 16 enables the bucket, arm, and boom assembly 17 to pivot left and right with respect to the rear end of the tractor. A hydraulic cylinder 19 is attached on one side of the tractor 18 to the boom 15 and provides the drive force for the pivoting motion. For larger backhoes, a pair of hydraulic cylinders are attached on opposite sides of the tractor 18 to pivot the boom. Hydraulic fluid is supplied to the cylinder 19 through valves that are manipulated by the backhoe operator. This movement of the boom 15 is referred to as "swing" or "slew".

As the boom swings, pressurized fluid is introduced into one chamber of the cylinder 19, referred to as the "driving chamber", and fluid is exhausted from the other cylinder chamber, referred to as the "exhausting chamber". When the operator suddenly stops the boom swing, inertia causes the motion of the backhoe assembly 17 to continue in the direction of the swing. The amount of inertia is a function of the mass of the backhoe assembly 17 and any material carried in the bucket 12. This continued movement after the control valves have been shut compresses the hydraulic fluid in the previous exhausting chamber of the cylinder 19 and may produce a void, or cavitation, in the previous driving cylinder chamber. Anti cavitation valves typically are provided in the hydraulic system to overcome this latter problem.

Eventually the backhoe assembly 17 stops and starts moving in the opposite swing direction due to the relatively high pressure created in the previous exhausting chamber. This subsequent movement produces a reversal of the pressure conditions, wherein the previous driving chamber of the boom swing cylinder 19 becomes pressurized. As a result, the backhoe assembly 17 swing oscillates until inherent dampening provided by other forces eventually brings the assembly to a stop. This phenomenon is known either as "swing bounce" or "swing wag" and increases the time required to properly position the boom 15, thereby adversely affecting equipment productivity.

Various approaches have been utilized to minimize the swing bounce. For example, U.S. Pat. No. 4,757,685 employs a separate relief valve for each hydraulic line connected to the swing cylinder, which valves vent fluid to a tank line when excessive pressure occurs in that cylinder. Additional fluid is supplied from the supply line through makeup valves to minimize voids in the cylinder as the swing stops.

U.S. Pat. No. 5,025,626 describes a cushioned swing circuit which also has relief and make-up valves connected to the hydraulic lines for the boom swing cylinder. This circuit also incorporates a cushion valve which in an open position provides a fluid path between the cylinder hydraulic lines. That path includes a flow restriction orifice. The cushion valve is resiliently biased into the shut position by a spring and a mechanism opens the cushion valve for a predetermined time period when the pressure differential between the cylinder chambers exceeds a given threshold.

Both of the previous circuits required a number of relatively complex valves. Therefore, it is desirable to provide a more simplified mechanism for reducing swing bounce.

SUMMARY OF THE INVENTION

A hydraulic system includes a control valve assembly, which selectively couples a pump and a tank to a hydraulic actuator that drives a member on a machine. The system has a device which produces a command designating desired movement of the load. A sensor detects pressure in the hydraulic actuator.

A method is provided to reduce bounce of the member when it stops. A command is received from the device designating that movement of the member in a given direction is to stop. The signal from the sensor is employed to determine the rate at which the pressure in the hydraulic actuator changes. When the rate of change of the pressure is less than a defined threshold after receiving the command, pressure in the hydraulic actuator is relieved. For example the pressure is relieved by opening a control valve that is connected to the hydraulic actuator.

In one application, the present bounce reduction method is used on a machine in which the member is driven by a cylinder that has first and second chambers. It is a well-known practice that this type of installation includes first and second pressure relief valves that are respectively connected to the first and second cylinder chambers. Thus upon receiving the command, pressure in the second chamber is relieved by opening an associated control valve. Then a determination is made whether the first pressure relief valve is open due to excessive pressure in the first chamber. If the first pressure relief valve is found to be open, the bounce reduction method waits for that valve to close, and thereafter opens another control valve that relieves pressure remaining in the first chamber. Otherwise if the first pressure relief valve is found to be closed, the rate of pressure change in the first chamber is determined, and pressure in the first chamber is relieved by opening the other control valve when the rate of pressure change is less than a defined threshold.

BRIEF DESCRIPTION OF THE DRAWINGS

FIG. 1 is a side view of a backhoe incorporating the present invention;

FIG. 2 is a schematic diagram of a hydraulic circuit for the swing function of the backhoe boom;

FIG. 3 is a block diagram of the microcomputer controller in FIG. 2;

FIG. 5A graphically depicts pressure changes in a chamber of the hydraulic cylinder that swings the backhoe assembly; and FIG. 5B is a graph of the slope of the changing pressure in FIG. 5A.

DETAILED DESCRIPTION OF THE INVENTION

Figure 4:
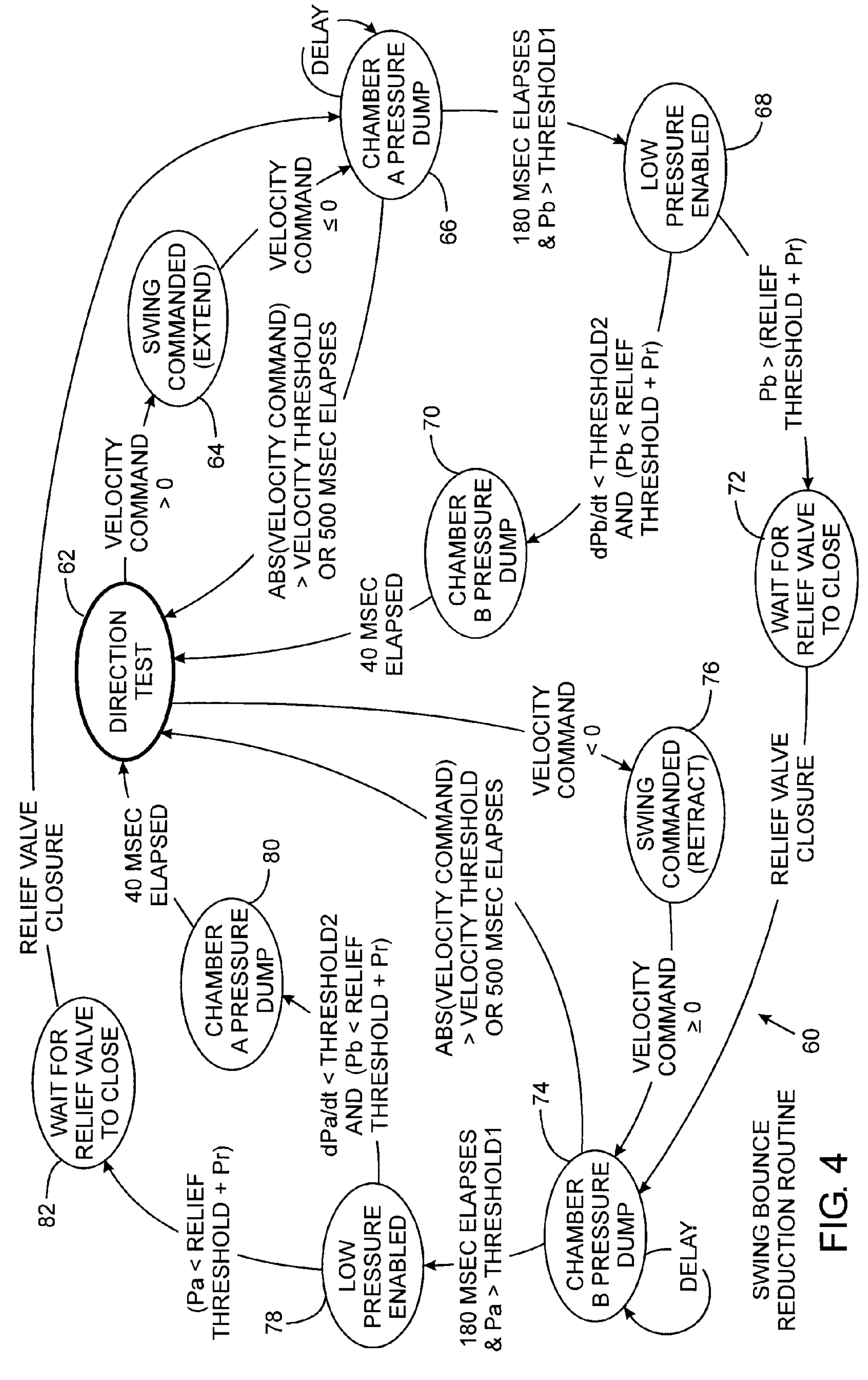
FIG. 4 is a state diagram depicting operation of a swing bounce reduction routine that is executed by the controller.

With reference to FIG. 2, a hydraulic circuit 20 for the backhoe 10 has a pump 2 which forces fluid from a tank 24 into a supply line 26. A conventional system pressure relief valve 28 opens in the event that the pump pressure exceeds a given safety threshold, thereby relieving that pressurized fluid to the tank 24 via the tank return line 29.

The supply line 26 and tank return line 29 are connected to a plurality of functions on the backhoe tractor 10. The hydraulic circuit for the boom swing function is shown in detail in FIG. 2. A valve assembly 30 of four solenoid operated, directional control valves 31–34 selectively couples the supply line 26 and tank return line 29 to a pair of actuator conduits 35 and 36 which lead to ports of a hydraulic actuator, such as a cylinder 19, that swings the boom 15. Specifically, the supply line 26 is connected by the first directional control valve 31 to the first actuator conduit 35 and by the second directional control valve 32 to the second actuator conduit 36. The tank return line 29 is coupled by the third directional control valve 33 to the first actuator conduit 35 and by the fourth directional control valve 34 to the second actuator conduit 36. For example, the valve described in U.S. Pat. No. 6,328,275 may be used in valve assembly 30. However, other types of valves may be utilized to implement the present inventive concept. The four directional control valves 31–34 are illustrated in the closed, or shut, position in which the actuator conduits 35 and 36 are disconnected from the pump and tank return lines 26 and 29. The first and second actuator conduits 35 and 36 also are designated by the letters A and B, respectively and the pressures in the actuator conduits (and the associated cylinder chamber) are designated Pa and Pb.

In the exemplary hydraulic circuit 20, the first actuator conduit 35 is connected to the head chamber 42 of the boom cylinder 19 and the second actuator conduit 36 is connected to the cylinder's rod chamber 40. Depending upon which specific ones of the four directional control valves 31–34 are activated, hydraulic fluid from the pump 22 is sent to one of the actuator conduits 35 or 36 and the other actuator conduit 36 or 35 is connected to the tank return line 29. Thus by opening either a combination of the first and fourth directional control valve 31 and 34 or the second and third directional control valves 32 and 33, the cylinder 19 is driven to extend or retract its piston rod 44 and thus move the backhoe boom 15 right or left. Although the present invention is being described in terms of operating a hydraulic cylinder, it should be understood that the novel concepts can be used with other types of hydraulic actuators, such as a hydraulic motor with a rotating shaft.

A first pressure relief valve 37 is connected to the first actuator conduit 35 to relieve excessive high pressure that may occur in the head chamber 42. Similarly, a second pressure relief valve 39 is connected to the second actuator conduit 36. These pressure relief valves 37 and 39 have a conventional design and are set to open at a significantly high pressure threshold. However, if a very heavy load is being carried in the bucket 12 when the boom 15 stops swinging, the pressure in a cylinder chamber due to the inertial load may exceed that threshold causing the associated pressure relief valve to open, as will be described. A pressure relief valve 37 or 39 opens when the pressure Pa or Pb in the respective actuator conduit 35 or 36 exceeds the pressure in the return line 29 plus a relief threshold, determined by force from a valve spring.

Pressure sensors are provided throughout the hydraulic circuit 20. Specifically, a first sensor 46 measures pressure in the supply line 26 and a second sensor 47 is located in the tank return line 29. Third and fourth pressure sensors 48 and 49 are provided in the first and second actuator conduits 35 and 36, respectively, and produce electrical signals indicating the pressure within the cylinder chambers 42 and 40 to which those actuator conduits are connected. The electrical signals from the four pressure sensors 46–49 are applied to inputs of an electronic controller 50. The controller 50 also receives input signals from an operator input device, such as a joystick 52. As will be described, the controller 50 responds to these input signals by producing output signals which activate the solenoids of the four directional control valves 31–34 to operate the swing function of the backhoe assembly 17.

Referring to FIG. 3, the controller 50 incorporates a microcomputer 54 which is connected by a set of buses 55 to a memory 56 in which the programs and data for execution by the microcomputer are stored. The set of buses 55 also connect input circuits 57 and output circuits 58 to the microcomputer 54. Each input circuit 57 for the pressure sensors 46–49 includes a first order, low-pass filter which attenuates frequencies above 100 Hz. This filtering removes any noise that might be present on the pressure sensor signals applied to the controller 50. The output circuits 58 provide signals to devices that indicate the status of the hydraulic system 20 to the backhoe operator. A set of valve drivers 59 controls the application of electricity to the solenoid coils in the four directional control valves 31–34. As will be described, the controller 50 executes software which implements a control algorithm for swinging the backhoe boom 15.

When the backhoe operator activates the joystick 52 to swing the boom 15 to the right or left, the signal generated by the joystick causes the controller 50 to begin executing a boom swing software routine that is stored in the memory 56. This routine controls selected ones of the four directional control valves 31–34 necessary to produce the indicated movement of the boom. On each execution pass through the control software for the backhoe 10, another routine is executed which detects when the boom swing is stopping and takes action to counter any significant bounce that may occur.

With reference to FIG. 2 and the state diagram of FIG. 4, the swing bounce reduction routine 60 commences at State 62 at which the routine remains when the boom is not swinging. In this State 62, the controller periodically tests to determine whether the boom is moving and if so, in which direction. To do so, the controller 50 examines the velocity command produced from the joystick signal. In the exemplary hydraulic system 20, a velocity command that is greater than zero indicates that the piston rod 44 is being extended from the cylinder 19, whereas a negative velocity command indicates that the piston rod is retracting into the cylinder. Assume initially that the velocity command is greater than zero, in which case a transition occurs from the Direction Test State 62 to the Swing Commanded State 64.

The operation of the swing bounce reduction routine 60 remains in this swing commanded State 64 until the operator manipulates the joystick 52 to indicate the boom is either stop or move in the opposite direction. That indication from the operator produces a new velocity command from the joystick which is either zero ora negative value in this situation. That change in the velocity command is detected at State 64 and produces a transition to State 66. If the velocity command now is zero, the routine for controlling the valve assembly 30 will close all four directional control valves 31–34.

The valve closure causes pressure within the rod chamber 40, from which fluid was previously being exhausted, to build up as the rod continues to extend from the cylinder due to the inertia load of the backhoe assembly 17. In addition, a significant pressure remains momentarily in the head chamber 42, which aids continued extension of the piston rod 44. Therefore upon entry into State 66, the swing bounce reduction routine 60 causes the third directional control valve 33 to open so that the pressure is relieved from the head chamber 42 to the tank return line 29. This initial pressure relief ensures that the pressure within the head chamber does not contribute to the continued motion of the backhoe assembly 17.

While the swing bounce reduction routine 60 is in State 66, the controller 50 periodically compares the absolute value of the velocity command to a velocity threshold. When the velocity command exceeds that threshold, the operator is again commanding motion of the backhoe assembly 17 in either direction. In that case, boom swing bounce is not a concern and a transition is made back to the Direction Test State 62 where the direction of the operator commanded boom motion is determined. This transition to State 62 also occurs when the operation remains in State 66 for more than 500 milliseconds. After remaining in State 66 for 180 milliseconds, the controller 50 Begins comparing the pressure level Pb in the rod chamber 40 to a first threshold level (THRESHOLD1) to determine whether the pressure within the previous exhausting cylinder chamber has build up to a significant level indicating that a bounce is likely to occur when the boom motion stops. The 180 millisecond delay prevents a pressure aberrations, which can occur momentarily when a directional control valve closes, from producing a state transition. Therefore, after the 180 milliseconds delay, if the pressure Pb within the rod chamber 40 exceeds the first pressure threshold a transition occurs to State 68.

At State 68 the controller 50 determines when to initiate a pressure relief operation to prevent rebounding of the backhoe assembly 17. In order to understand how the present swing bounce reduction routine 60 make that determination, reference is made to FIG. 5A which graphically depicts pressure change within the rod chamber 40 following closure of the valves when the piston rod 44 is being extended. Initially that pressure rises until the motion of the boom 15 stops at time T1, after which the pressure Pb decreases as the boom moves in the opposite direction. The swing bounce reduction routine 60 makes one of two transitions from State 68 depending on whether the pressure rises to a level that causes the second pressure relief valve 39 to open. That event is indicated by pressure Pb in the second actuator conduit 36 exceeding the valve's constant relief threshold plus the pressure Pr in the return line 29, as represented by the input signal from sensor 47.

While the second pressure relief valve 39 remains closed, the swing bounce reduction routine 60 at State 68 uses the rate of change of the pressure Pb to determine when to open the fourth direction control valve 34 to relieve that pressure and prevent rebound of the backhoe assembly 17. If that control valve is opened too soon, sufficient pressure will not build up in the rod chamber 40 to significantly slow the piston rod 44 and the attached backhoe assembly 17. In that situation, inertia may cause the boom assembly 17 to continue swinging until striking a stop at one end of the pivot joint 16. Conversely, if the valve is not opened soon enough, the pressure will not be relieved in time to prevent rebound of the piston and bounce of the backhoe assembly 17. The rate of change of the pressure Pb in the second actuator conduit 36 is employed as an indicator of when the backhoe assembly 17 has slowed enough that the pressure can be relieved in time to prevent boom bounce. The rate of change corresponds to the slope of the pressure curve in FIG. 5A and is given mathematically by the derivative of the pressure which is plotted on the graph of FIG. 5B.

Thus, the controller 50 employs the input signal from pressure sensor 49 at State 68 to determine the derivative (dPb/dt) of the pressure Pb in the second actuator conduit 36. The derivative value is checked to determine whether it is less than a second threshold (THRESHOLD2), indicated by a dotted line, which occurs as the rate of pressure change decreases just prior to the point 67 of maximum pressure. This condition indicates that the hydraulic actuator and the boom assembly attached thereto have slowed a given amount. When this condition exists while the second pressure relief valve 39 is closed (i.e. pressure Pb is less than the relief threshold plus the return line pressure Pr), a transition is made from State 68 to State 70.

The preferred embodiment of the swing bounce reduction routine 60 employs the rate of pressure change to determine when the hydraulic actuator and the boom assembly have slowed to a point at which action to reduce bounce can be taken. However, other methods for making that determination can be used instead, For example, a sensor can provide a signal indicating the swing position of the boom and the rate of position change used to determine when to implement bounce reduction. A velocity sensor or an accelerometer alternatively could be employed to detect when motion of the hydraulic actuator or the boom assembly has slowed to the point at which bounce reduction can be implemented.

At State 70, the controller 50 opens the fourth directional control valve 34 to relieve the pressure in the rod chamber 40 of cylinder 19 to the tank 24 via the return line 29. This prevents the pressure which has previously built up by the continued extension of the piston rod 44 from causing the piston rod to bounce back in the opposite direction. The fourth directional control valve 34 remains open for a fixed period of time (e.g. 40 milliseconds) after which the control valve is closed and a transition returns the swing bounce reduction routine to the Direction Test State 62.

However, if a determination is made at State 68 that the second pressure relief valve 39 has opened, i.e. pressure Pb exceeds that valve's relief threshold plus the pressure Pr within the tank return line 29, a transition occurs to State 72. Because opening of the second pressure relief valve 39 provides a path which relieves pressure from the rod chamber 40, the swing bounce reduction routine 60 remains in State 72 until a closure of the second pressure relief valve 39 is detected. That closure is indicated by a the pressure Pb within the second actuator conduit 36 decreasing below the relief threshold plus the pressure in the tank return line 29, or by a pressure drop in the second actuator conduit 36 accompanied by a pressure increase in the first actuator conduit 35 as transpires when the piston rod 44 rebounds and moves in the opposite direction. When either of these conditions occurs, the swing bounce reduction routine 60 makes a transition from State 72 to State 74.

The controller 50 in State 74 opens the fourth directional control valve 34 to relieve any residual pressure within the rod chamber 40 for a predefined period (e.g. 30 milliseconds) after which the fourth directional control valve is closed. This action relieves the pressure within the cylinder 19 due to the inertial motion of the backhoe assembly 17 thereby preventing rebound of the piston and bounce of the backhoe boom 15. The swing bounce reduction routine 60 remains in State 74 for a total of 500 milliseconds after which a transition occurs back to the Direction Test State 62.

While in State 62, when the operator desires that the boom 15 swing in the opposite direction, as indicated by the joystick 52 producing a negative velocity command, a transition is made to State 76. State 76 is the reciprocal of State 74 and operation of the anti-bounce routine is similar thereto with the understanding that the boom 15 is moving in the opposite direction. Therefore, when the velocity command is zero or greater, as occurs when the operator intends to stop the boom or reverse its direction, another transition occurs to State 74. Because in this mode of operation the piston rod 44 is retracting into the cylinder 19, pressurized fluid from the pump 22 was previously applied to the rod chamber 40. Therefore at State 74, the fourth direction control valve is opened by the controller 50 to relieve that pressure Pb so that it does not contribute to the continued motion of the boom 15. Operation at this time is similar to that which occurred at State 66 when motion in the opposite direction was stopping. Therefore, under similar transition conditions, if the operator's movement of the joystick produces a new velocity command or 500 milliseconds have elapsed, a transition occurs back to the Direction Test State 62. Otherwise, the swing bounce reduction routine 60 eventually makes a transition to State 78.

In State 78, if the first pressure relief valve 37 is not detected as opened, the anti-bounce routine enters State 80 where the pressure in the head chamber is relieved by opening the third directional control valve 33. Thereafter, the operation returns to the Direction Test State 62. Otherwise, when the pressure Pa in the head chamber 42 is great enough to open the first pressure relief valve 37, a transition occurs to State 82 where the operation remains until the relief valve closure is detected. At that time, operation moves into State 66 where residual pressure within the head chamber 42 is relieved by opening the third direction control valve 33 for a predefined period before transitioning back to the Direction Test State 62.

The foregoing description was primarily directed to a preferred embodiment of the invention. Although some attention was given to various alternatives within the scope of the invention, it is anticipated that one skilled in the art will likely realize additional alternatives that are now apparent from disclosure of that embodiment. For example, although the invention has been described in the context of reducing swing bounce of a backhoe assembly, the novel technique can be applied to other types of motion by a variety of machine members. Accordingly, the scope of the invention should be determined from the following claims and not limited by the above description.

What is claimed is:

1. A method for controlling movement of a member that is driven by a hydraulic actuator connected to a valve assembly through which fluid flows, the method comprising:

receiving a command designating that movement of the member in a given direction is to stop;

sensing a parameter which varies with movement of the member;

employing the parameter to determine when movement of the member has slowed to a defined speed and in response thereto producing an indication; and in response to the indication and to receiving the command, relieving pressure in the hydraulic actuator.

2. The method as recited in claim 1 wherein:

sensing a parameter comprises sensing pressure occurring in the hydraulic actuator; and employing the parameter comprises determining a rate at which the pressure changes and producing the indication when the rate is less than a defined threshold.

3. The method as recited in claim 1 wherein employing the parameter comprises determining a rate at which the parameter changes and producing the indication when the rate has a defined value.

4. The method as recited in claim 1 wherein relieving pressure in the hydraulic actuator comprises opening a control valve.

5. The method as recited in claim 1 wherein relieving pressure in the hydraulic actuator is further in response to the pressure in the hydraulic actuator being greater than a threshold value.

6. The method as recited in claim 1 further comprising:

determining whether a pressure relief valve connected to the hydraulic actuator is closed; and wherein relieving pressure in the hydraulic actuator occurs in response to the hydraulic actuator being closed.

7. The method as recited in claim 6 wherein determining whether the pressure relief valve is closed is based on comparing pressure in the hydraulic actuator to a defined pressure level.

8. The method as recited in claim 6 further comprising when the pressure relief valve is determined not to be closed, opening a valve in the valve assembly.

9. The method as recited in claim 1 further comprising:

determining whether a pressure relief valve connected to the hydraulic actuator is open after receiving the command;

after determining that the pressure relief valve is open, detecting closure of the pressure relief valve; and upon detecting closure of the pressure relief valve, opening a control valve that relieves pressure remaining in the hydraulic actuator.

10. The method as recited in claim 9 wherein detecting closure of the pressure relief valve comprises detecting when pressure in the hydraulic actuator decreases below a given level.

11. A method for controlling movement of a member that is driven by a hydraulic actuator having a first chamber and a second chamber, the method comprising:

receiving a command designating that movement of the member in a given direction is to stop;

sensing pressure in the first chamber;

determining a rate at which the pressure in the first chamber changes; and after receiving the command, relieving pressure in the first chamber in response to the rate of change of the pressure being less than a defined threshold.

12. The method as recited in claim 11 wherein relieving pressure in the first chamber occurs only after pressure in the first chamber exceeded a defined threshold.

13. The method as recited in claim 11 wherein relieving pressure comprises, for a given period of time, opening a control valve connected to the first chamber.

14. The method as recited in claim 11 further comprising relieving pressure in the second chamber in response to receiving the command.

15. The method as recited in claim 14 wherein relieving pressure in the second chamber comprises opening a control valve for a defined period of time.

16. A method for controlling movement of a member that is driven by a hydraulic actuator having a first chamber and a second chamber, the method comprising:

receiving a command designating that movement of the member in a given direction is to stop;

sensing pressure in the first chamber;

determining whether a pressure relief valve connected to the first chamber is open or closed; and after receiving the command:

(a) if the pressure relief valve is open, determining when the pressure relief valve closes and thereafter relieving pressure remaining in the first chamber, and (b) if the pressure relief valve is closed, determining a rate of change of the pressure in the first chamber, and relieving that pressure in response to the rate of change being less than a defined threshold.

17. The method as recited in claim 16 further comprising relieving pressure in the second chamber in response to receiving the command.

18. The method as recited in claim 17 wherein relieving pressure in the first chamber comprises opening a first control valve, and relieving pressure in the second chamber comprises opening a second control valve.

19. The method as recited in claim 16 wherein determining whether the pressure relief valve is open comprises determining whether the pressure in the first chamber is greater than a given pressure level.

20. The method as recited in claim 16 wherein determining when the pressure relief valve closes comprises detecting when pressure within the first chamber decreases below a given pressure level.

21. The method as recited in claim 16 wherein determining when the pressure relief valve closes comprises detecting when pressure in the first chamber decreases and pressure in the second chamber increases.

* * * * *